United States Patent [19]

Lavoie

[11] Patent Number: 4,874,445
[45] Date of Patent: Oct. 17, 1989

[54] METHOD FOR REPAIRING FUEL TANKS

[75] Inventor: Patrick J. Lavoie, Lakefield, Canada

[73] Assignee: Gas Tank Renu - USA, Detroit, Mich.

[21] Appl. No.: 189,669

[22] Filed: May 3, 1988

[51] Int. Cl.$^4$ .............................................. B32B 35/00
[52] U.S. Cl. .................... 156/64; 29/402.01; 156/94; 156/153; 228/103; 228/119; 264/36; 427/140; 428/63
[58] Field of Search ............... 29/402.01; 156/64, 94, 156/153; 228/103, 119; 264/36; 427/140; 428/63

[56] References Cited

U.S. PATENT DOCUMENTS

| | | |
|---|---|---|
| 2,186,185 | 1/1940 | Walker . |
| 3,728,776 | 4/1973 | Defazio . |
| 4,022,935 | 5/1977 | Kinney et al. ............... 427/142 X |
| 4,059,884 | 11/1977 | Weill ............................. 29/401 E |
| 4,255,845 | 3/1981 | Henderson ..................... 29/402.02 |
| 4,614,226 | 9/1986 | Ryan ................................. 165/76 |
| 4,655,383 | 4/1987 | Fournes et al. ................... 228/119 |
| 4,662,959 | 5/1987 | Morgan ............................. 156/94 |

OTHER PUBLICATIONS

Gas Tank Renu Service Brochure.

Primary Examiner—Robert A. Dawson
Attorney, Agent, or Firm—Gifford, Groh, Sheridan, Sprinkle and Dolgorukov

[57] ABSTRACT

A method is provided for repairing fuel tanks. The method includes defuming the fuel tank, removing rust and tar from the surface of the tank, coating the exterior surface of the gas tank with a plastisol compound and heating the plastisol compound to cure the compound and bond the compound to the fuel tank. The method provides a fast and inexpensive procedure for repairing fuel tanks.

11 Claims, 2 Drawing Sheets

METHOD FOR REPAIRING FUEL TANKS

BACKGROUND OF THE INVENTION

I. Field of the Invention

The invention relates to a method for repairing fuel tanks, more particularly, a method for repairing fuel tanks utilizing a plastisol compound.

II. Brief Description of the Prior Art

Because of the necessity for increased fuel economy in automobiles, the automakers have attempted to reduce the weight of the automobiles. The drive for weight reduction has resulted in the installation of lighter weight fuel tanks in automobiles. The lighter tanks have thinner metal walls than those of the previously used tanks. The lightweight fuel tanks are more readily subject to leakage resulting from corrosion or subject to damage in the form of puncturing, gouges, scrapes and bends. As a result, there is an increasing number of fuel tank failures occurring before the expiration of the life of the car.

It is known, as disclosed by U.S. Pat. No. 4,662,959 to Morgan, to repair gasoline fuel tanks by sealing the tank with fiberglass. The method involves applying patches of fiber material over detected leak holes, applying a mixture of peroxide resin over the fiber patches with a brush, and squeezing out any air bubbles with a roller to reseal the tank. However, this process is both time consuming and labor intensive.

Because replacement fuel tanks are quite costly, it would be desirable to have a method of repairing fuel tanks which is less expensive than a replacement tank, and which is easily and speedily performed.

SUMMARY OF THE INVENTION

The invention relates to a method for repairing gas tanks which may be quickly and economically performed. The method is utilized on fuel tanks which have been removed from an associated apparatus, such as an automobile or truck. All fuel is eliminated from the tank. After eliminating the fuel from the tank, tar is removed by heating and scraping, and rust and corrosion is removed by sandblasting. All leaks in the tank are covered to seal the tank. Small holes are filled with a plastisol compound which is then heat set. Larger holes are covered with sheet metal and brazed. The surface of the tank is then completely coated with a plastisol compound. The compound is bonded to the tank by heating the tank in an oven. The tank is then cooled and pressure tested to ensure the integrity of the repair.

Applicant's method of repair is economical and may be readily performed. These and other advantages will become apparent with reference to the drawings and detailed description of the preferred embodiment.

DETAILED DESCRIPTION OF THE PREFERRED EMBODIMENT

Figure 1:
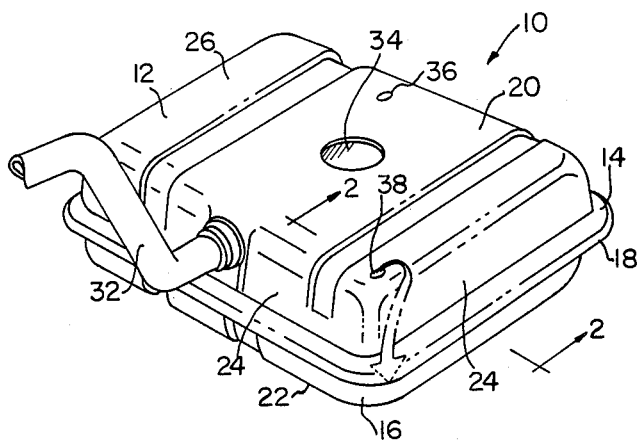
FIG. 1 is a perspective view of a fuel tank for repair in accordance with the method of the invention.

The fuel tank 10, typical of the type which is installed in automobiles, is shown in FIG. 1. The tank has been removed from the vehicle for repair in accordance with the method of the invention. The tank 10 has an upper shell 12 having a peripheral flange 14 and a lower shell 16 having a corresponding peripheral flange 18. The flange 14 of the upper shell is sealingly affixed to the flange 18 of the lower shell. The tank has a top portion 20, a bottom portion 22, and four side walls 24.

Figure 2:
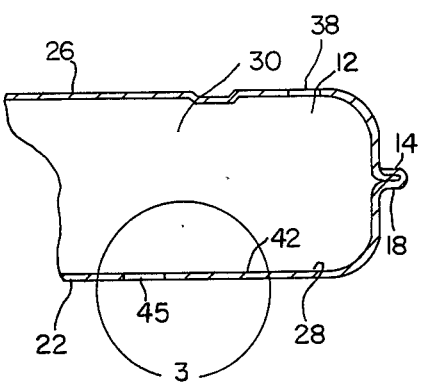
FIG. 2 is a sectional view of a portion of a tank taken along lines 2—2 of FIG. 1.

As shown in FIG. 2, the tank has an outer surface 26 and an inner surface 28 defining a chamber 30. The chamber 30 is adapted to receive and store a supply of fuel such as gasoline or diesel oil within the tank 10. As best shown in FIG. 1, a fill pipe 32 extends from one of the side walls 24 for introducing the fuel into the chamber 30. An outlet 34 is formed through the top portion 20 for connection to a fuel supply system (not shown) of the vehicle. A bore 36 is provided through the top surface for receiving a sending unit for a gas gauge (not shown). The upper and lower shell may be formed of any suitable rigid metal, such as steel.

Figure 6:
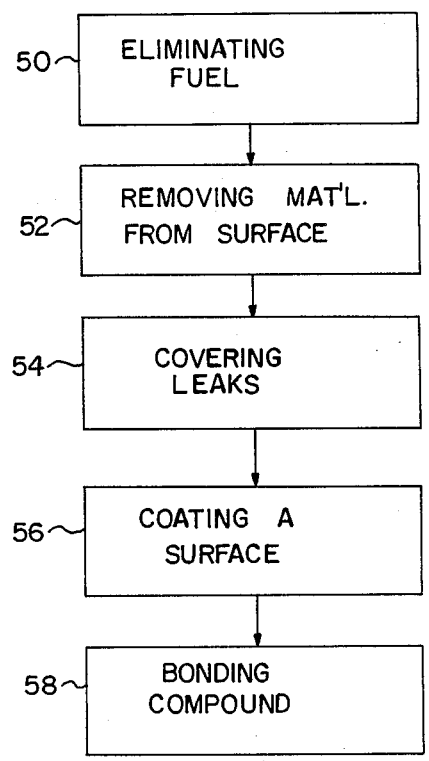
FIG. 6 is a flow diagram in block form showing the process employed to repair the gas tank in accordance with the invention.

As shown in FIG. 6, the process is shown in five stages or steps. The first stage is eliminating all fuel from the tank at 50. The second stage is removing material from the surface of the tank at 52. The third step is covering leaks in the tank at 54. The fourth step is coating a surface of the tank with a plastisol compound at 56. Finally, the last stage is bonding the plastisol compound to the tank at 58.

Figure 5:
FIG. 5 is a partial sectional view of the tank showing the drain hole plug in accordance with the invention.
Figure 7:
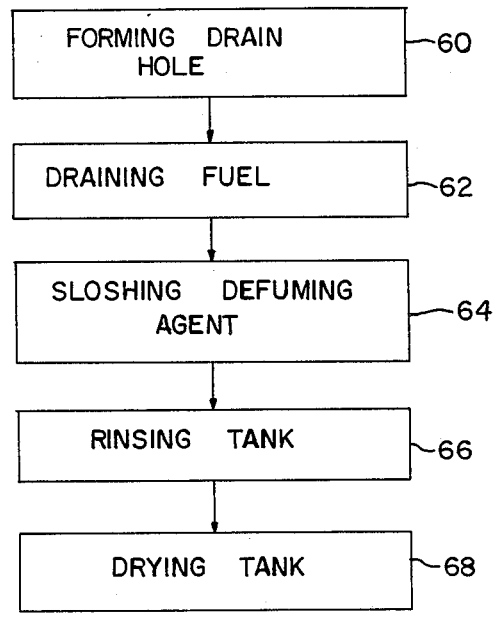
FIG. 7 is a flow diagram in block form showing the eliminating step as a series of substeps.

The first stage of the process is eliminating all fuel from the tank 10 to make the tank safe to handle and work with. After the tank 10 has been disconnected and removed from the vehicle or apparatus, all traces of fuel must be removed from the tank. In the event the tank still contains fuel in liquid form, the fuel is eliminated according the the steps of the preferred embodiment as set forth in FIG. 7. The fuel is eliminated by forming 60 the drain hole 38 through the top portion 20 of the tank, as shown in FIG. 1. In the preferred embodiment, the drain hole 38 has a diameter of approximately ⅜" and is formed in a suitable manner such as drilling. As will be set forth in more detail below, the drain hole 38 may be resealed later by use of a plug 40 shown in FIG. 5.

After drilling the drain hole 38, the tank is turned over and fuel is permitted to drain through the drain hole 38 into a suitable receptor such as a pail. After all of the fuel has been drained from the tank 10, as many of the leaks as possible should be temporarily plugged. After plugging the leaks, a quantity of a liquid defuming agent is inserted into the chamber 30 of the tank. The tank is then manually moved about for sloshing at 64 the defuming agent about the chamber 30 again to ensure that the entire inner surface 28 of the tank is covered with the defuming agent. In the preferred embodiment, one liter of the defuming agent marketed as Renu 20, by Tetra Chem Industries, 30 Green Valley Drive, Ste. 109, Kitchner, Ontario, Canada, is employed. The defuming agent is supplied in a concentrated form and must be diluted with water at a portion of one to ten. The sloshing of the tank should be performed for about fifteen to thirty seconds to ensure that the inner surface is completely covered. After sloshing, the defuming agent is drained and discarded. Any plugs are removed from the leakage holes and the defuming agent is removed from the tank and chamber by rinsing with water at 66.

After rinsing the tank with water, the tank is dried at 68. In the preferred embodiment, the tank is dried by placing the tank in a conventional oven for approximately ten minutes at 350° F. Over drying the tank softens any tar on the outer surface 26 of the tank to aid in cleaning the tank during the second stage of the method.

Figure 8:
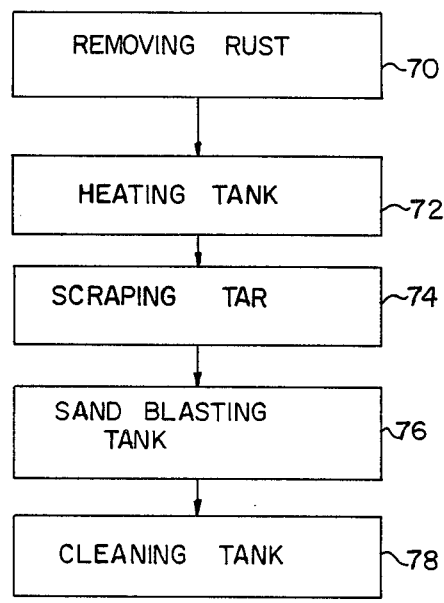
FIG. 8 is a flow diagram in block form showing the cleaning step as a series of substeps.

As shown in FIG. 6, after the fuel has been eliminated, the removing stage or step 62 is performed. Foreign substances such as tar, loose particles and rust are removed from the tank. Depending on the condition of the tank, the removing stage consists of any or all of the following steps, as shown in FIG. 8. In the event that the tank has internal rust on the inner surface 28 of the tank, a conventional chemical rust remover is introduced into the chamber 30 in a sufficient amount to cover the rust areas for removing the rust at 70. The rust remover, as known in the art, should be allowed to sit on the inner surface of the tank for a period of time with an occassional agitation to remove the rust. After the rust is loosened, the rust remover is drained from the tank and a coating of conventional rust preventative may be applied to protect against further rust in the future.

After the internal rust is removed, the outer surface 26 of the tank is detarred. If the tank is not warm from the defuming process, the tank is placed in the oven for heating at 72 the tank at 350° F. for five to ten minutes or until any tar or the outer surface 26 of the tank is soft to the touch. The tank is removed from the oven, and any tar on the outer surface of the tank is removed by scraping at 74 with a conventional scraper, as is known in the art.

After the tank has been detarred, the tank is prepared for sandblasting at 76 to remove rust and loose metal from the outer surface of the tank. The fill pipe 32 and outlet 34 are covered with suitable covers, such as rubber caps, to prevent any steel grit from the sandblasting process from entering the tank during the sandblasting. After the fill pipe 32, the outlet 34, and other holes or apertures are sealed, the tank is sandblasted as is known in the art. In the preferred embodiment, the tank is sandblasted with a sandblaster utilizing Grade G-40 steel shot. The sandblaster is of suitable size to receive the tank for sandblasting. After the tank has been completely sandblasted and all rust is removed from the exterior surface, the tank is removed from the sandblaster for cleaning at 78. All of the sandblasting particles are removed from the chamber 30 and outer surface of the tank. The tank should be well shaken to remove any particles from baffles (not shown) in the chamber 30 of the tank. After the cleaning step 78, all rust, tar and grit from the sandblasting operation has been removed.

Figure 3:
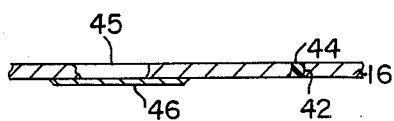
FIG. 3 is a sectional view of a portion of the tank encircled in FIG. 2 having a patch brazed in accordance with the invention.
Figure 9A:
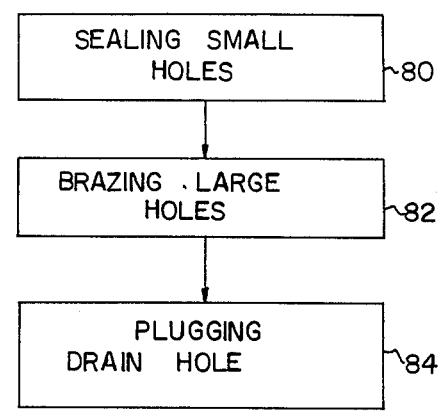
FIG. 9(a) is a flow diagram in block form showing the covering step as a series of substeps.

After the removing stage at 52, a covering stage at 54 is carried out. As set forth in FIG. 9(a), the covering stage may consist of sealing small holes at 80, brazing large holes at 82, and plugging the drain hole at 84. Depending on the condition of the tank, any or all of the above steps are followed. As shown in FIGS. 2 and 3, smaller holes 42, up to a ⅛" in diameter are sealed with a portion 44 of the paste of plastisol compound. As is known, plastisol is a dispersion of finely divided resin in a plasticizer. The compound forms a gel when heated to a critical temperature. The plastisol compound should be of the type which is not soluable in gasoline and relatively smokeless when heated. In the preferred embodiment, a suitable paste is acquired from Sternson Ltd., 220 Mohawk St., P.O. Box 130, Brantford, Ontario, Canada, and is identified as PL 1166. The paste may be applied by a suitable means, such as a brush. As shown in FIG. 3, the plastisol paste 44 is applied to fill the smaller rusted out holes 42. After the paste has been applied to the tank, the paste is heated with a heat gun to set the paste to a gel and bond the compound to seal the smaller holes 42.

As shown in FIGS. 2 and 3, larger apertures such as hole 45, which cannot be repaired with the plastisol paste, is repaired by brazing at 82 a patch 46 to the outer surface 26 of the tank, as is known in the art. The patch 46 may be of any suitable metal, such as tin, and is affixed to extend across the hole 45.

For plugging the drain hole at 84, the plug 40 (shown in FIG. 5) is sealingly inserted into the drain hole. A suitable plug may be a knockout plug from an electrical box. The plug 40 is coated with the plastisol paste 44. The plug 44 with the plastisol paste coating is placed in the drain hole 38. A heat gun is used to apply heat to the plastisol paste 44 to gel and set the compound. The plug is thus sealingly affixed in the drain hole 38.

Figure 4:
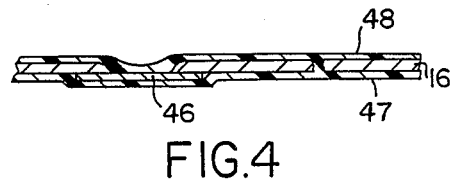
FIG. 4 is a sectional view of the portion of the tank shown in FIG. 3 after it has been repaired in accordance with the invention.

After the drilled aperture is sealed and all of the rusted out holes are sealed as set forth above in the covering stage, the tank is ready for coating at 56. The tank 10 is covered completely with a coating of the paste 44 of plastisol compound. The paste is applied by spreading the paste on the surface of the tank with a brush. As shown in FIG. 4, an even coat 47 of the paste is applied over the outer surface 26 of the tank 10. The entire tank, including flanges 14 and 18, patch 46, as well as the junction of the fill pipe is covered. The tank may be supported on a rack (not shown) having arms engaging the tank while the coat of the external plastisol compound is applied to the upper shell 12 of the tank. After the upper shell has been completely covered, the tank is turned over and the lower shell 16 is coated in the same manner as above.

In the event that the inner surface 28 of the gas tank is badly rusted, the inner surface of the tank may be coated with a plastisol liquid. The plastisol liquid, like the plastisol paste, is not soluable in gasoline. However, the plastisol liquid is more viscous than the paste in order that the liquid may be poured into the chamber 30 of the tank and applied by sloshing the liquid around to form a coating 48 on the inner surface 28. A suitable plastisol liquid is sold by Sternson Ltd., as set forth above, and identified as PL 1171.

Figure 9B:
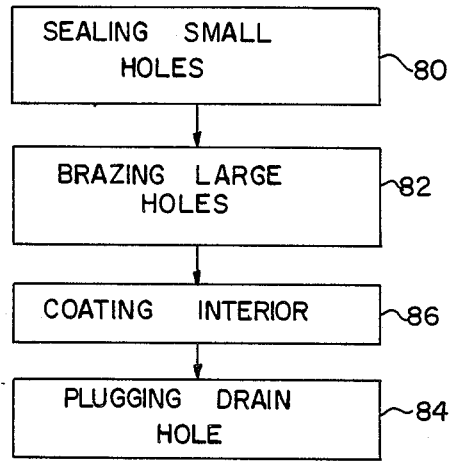
FIG. 9(b) is a flow diagram in block form of an alternative embodiment of the covering step.

When coating the inner surface with plastisol liquid, an alternative embodiment of the covering step may be used as set forth in FIG. 9(b). The plastisol liquid is applied after all of the small and large rusted out holes are filled, as set forth above. The sender bore 36 and fill pipe 32 are covered with rubber caps. However, the liquid is introduced into the chamber 30 prior to the sealing of the drain hole 38. Then two or three quarts of the plastisol liquid are poured into the chamber and sloshed around until the inner surface of the chamber is completely covered with a coating 48 of the liquid. Any excess liquid is drained from the chamber through the drain hole 38. After the excess liquid is drained, the knockout plug is installed in the drain hole as set forth above and sealed with the external plastisol compound.

Figure 10:
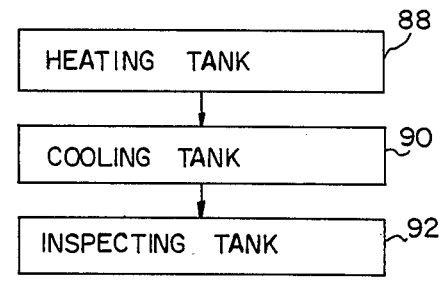
FIG. 10 is a flow diagram in block form showing the bonding step as a series of substeps.

The final stage or step is bonding the plastisol compound to the tank 58. As is set forth in FIG. 10, the bonding stage 58 consists of the steps of heating the tank at 88, cooling the tank at 90, and, if desired, inspecting the tank at 92. The tank is heated by placing the tank in the heating oven for 15 minutes at approximately 350° F. The plastisol paste on the outer surface and optional plastisol liquid will gel accordingly. If the tank is coated only on the outer surface with the plastisol paste, the tank is placed in the oven and heated for 15 minutes at approximately 350° F.

In the event that a coating 48 of liquid compound is applied, the outer surface of the upper shell 12 of the tank is first coated with the paste of plastisol compound as set forth above. The tank is placed in the heating oven for 5 minutes at approximately 350° F. The paste on the outer surface 26 will gel in the heat and the liquid will flow to provide an even coat of plastisol compound on the inner surface 28 of the tank. The tank is then removed from the oven and the outer surface of the lower shell 16 of the tank is covered with a coat 47 of the paste of plastisol compound with a brush in the same manner as set forth above. The tank is then returned to the oven for fifteen minutes at approximately 350° F. to gel the plastisol compound.

After removing the tank from the oven and cooling the tank to room temperature, the plastisol compound is bonded to the surface of the tank so that it cannot be pulled off. Any areas of the plastisol compound which are scarred from contact with the oven may be repaired by reheating the plastisol compound with a heat gun. The repair process should be complete. However, the repair may be tested in order to ensure the repair has been properly performed. The tank should be visually inspected to ensure that the outer coating of plastisol compound has properly bonded to all areas of the tank. The tank may then be subjected to a pressure test in which the tank is sealed and completely immersed in water. An air pressure of 5 lbs. psi is introduced into the tank and the tank is inspected to ensure no air leaks out of the tank through the water. If no leaks are found, the tank is properly repaired and ready for reinstallation and use.

Obviously, many modifications and variations of the present invention are possible in the light of the above teachings. The invention may be used with many types of tanks for use with various types of machinery or for holding liquids other than gasoline or diesel oil. The foregoing description is provided for illustrative purposes only and should not be construed as limiting this invention, the scope of which is defined by the appended claims.

What is claimed is:

1. A method for repairing a fuel tank having an outer surface and an inner surface comprising the steps of:
    eliminating all fuel from said tank;
    removing tar and rust from said inner and outer surfaces;
    covering leakage holes in said tank with a sealing material;
    coating at least one of said outer and said inner surfaces with a plastisol compound; and
    bonding said plastisol compound to said tank by heating said plastisol compound to a predetermined temperature of at least 350° F., for a predetermined time.

2. The method for repairing as claimed in claim 1 wherein said eliminating step further comprises sloshing a liquid defuming agent against said inner surface of said tank to remove gas fumes from said tank.

3. The method for repairing as claimed in claim 1 wherein said covering step further comprises brazing said outer surface of said tank to cover larger holes.

4. The method for repairing as claimed in claim 1 wherein said covering step further comprises filling small holes up to a ⅛" in diameter with said plastisol compound and heating said plastisol compound to form a gel of said plastisol compound.

5. The method for repairing as claimed in claim 1 wherein said eliminating step further comprises forming a drain hole in a top surface of said tank for draining fuel from said tank.

6. The method for repairing as claimed in claim 5 wherein said covering step further comprises filling said drain hole with a plug having a coating of plastisol compound and heating said plastisol compound to seal said drain hole.

7. The method of repairing as claimed in claim 1 wherein said removing step further comprises sandblasting said outer surface of said tank.

8. The method of repair as claimed in claim 1 wherein said bonding step further comprises cooling said plastisol compound to room temperature after heating said compound to said predetermined temperature.

9. The method of repair as claimed in claim 8 wherein said bonding step further comprises inspecting said tank for leaks after said step of cooling said plastisol compound.

10. The method of repair as claimed in claim 1 wherein said predetermined time of said bonding step is at least fifteen minutes.

11. The method of repairing as claimed in claim 1 wherein said plastisol compound of coating step is a paste and said at least one surface of said outer and inner surfaces is said outer surface.

* * * * *

UNITED STATES PATENT AND TRADEMARK OFFICE
CERTIFICATE OF CORRECTION

PATENT NO.   : 4,874,445
DATED        : October 17, 1989
INVENTOR(S)  : Patrick J. Lavoie It is certified that error appears in the above-identified patent and that said Letters Patent is hereby corrected as shown below:

Column 1, line 46, delete "Larger" and insert --Large--;

Column 3, line 20, delete "Over" and insert --Oven--.

Signed and Sealed this

Sixteenth Day of October, 1990

Attest:

HARRY F. MANBECK, JR.

Attesting Officer

Commissioner of Patents and Trademarks